United States Patent
Noh et al.

(10) Patent No.: US 8,769,276 B2
(45) Date of Patent: Jul. 1, 2014

(54) METHOD AND SYSTEM FOR TRANSMITTING AND RECEIVING USER'S PERSONAL INFORMATION USING AGENT

(75) Inventors: Jong-Hyouk Noh, Daejeon (KR); Seung-Hyun Kim, Daegu (KR); Dae Seon Choi, Daejeon (KR); Sang Rae Cho, Daejeon (KR); Yeong Sub Cho, Daejeon (KR); Seung Hun Jin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 998 days.

(21) Appl. No.: 12/097,179

(22) PCT Filed: Dec. 6, 2006

(86) PCT No.: PCT/KR2006/005246
§ 371 (c)(1),
(2), (4) Date: Jun. 12, 2008

(87) PCT Pub. No.: WO2007/069831
PCT Pub. Date: Jun. 21, 2007

(65) Prior Publication Data
US 2008/0294896 A1 Nov. 27, 2008

(30) Foreign Application Priority Data
Dec. 12, 2005 (KR) .......................... 10-2005-0121986

(51) Int. Cl.
*H04L 9/32* (2006.01)
(52) U.S. Cl.
USPC ........................................................ 713/168
(58) Field of Classification Search
USPC ........................................................ 713/168
See application file for complete search history.

(56) References Cited

U.S. PATENT DOCUMENTS

| 5,987,440 | A | * | 11/1999 | O'Neil et al. .................... 705/44 |
| 6,023,762 | A | * | 2/2000 | Dean et al. ..................... 713/193 |
| 6,115,699 | A | * | 9/2000 | Hardjono ......................... 705/51 |
| 6,125,186 | A | | 9/2000 | Saito et al. |
| 6,681,243 | B1 | * | 1/2004 | Putzolu et al. ................ 709/202 |
| 7,254,705 | B2 | * | 8/2007 | Yokota et al. ................. 713/155 |

(Continued)

FOREIGN PATENT DOCUMENTS

| JP | 2001-331446 | 11/2001 |
| JP | 2002-297385 | 10/2002 |
| KR | 1020020059794 | 7/2002 |
| KR | 1020030033854 | 5/2003 |
| KR | 1020030066134 | 8/2003 |

OTHER PUBLICATIONS

Cartrysse, K. et al., "Privacy in mobile agents," *First IEEE Symposium on Multi-Agent Security and Survivability*, pp. 73-82 (2004).

*Primary Examiner* — Esther Benoit
(74) *Attorney, Agent, or Firm* — Nelson Mullins Riley & Scarborough LLP (57) ABSTRACT

A method and system for transmitting and receiving user's personal information using an agent are provided. An information management server managing user's personal information provides an agent including user's personal information in response to a user's personal information request message from a client. A client receives the agent and requests user's personal information from the agent. Then, the agent determines whether the client is authorized and provides the user's personal information to the client when it is determined that the client is authorized. Accordingly, the user's personal information is safely managed and transmitted.

17 Claims, 4 Drawing Sheets

(56) References Cited

U.S. PATENT DOCUMENTS

| | | | |
|---|---|---|---|
| 2002/0049906 A1* | 4/2002 | Maruyama et al. | 713/176 |
| 2003/0018608 A1* | 1/2003 | Rice et al. | 707/1 |
| 2005/0105719 A1* | 5/2005 | Hada | 380/28 |
| 2005/0144218 A1* | 6/2005 | Heintz | 709/202 |
| 2009/0133107 A1* | 5/2009 | Thoursie | 726/6 |

* cited by examiner

METHOD AND SYSTEM FOR TRANSMITTING AND RECEIVING USER'S PERSONAL INFORMATION USING AGENT

RELATED APPLICATIONS

This application is a 35 U.S.C. 371 national stage filing of International Application No. PCT/KR2006/005246, filed Dec. 6, 2006 which claims priority to Korean Patent Application No. 10-2005-0121986 filed on Dec. 12, 2005. The contents of the aforementioned applications are hereby incorporated by reference.

TECHNICAL FIELD

The present invention relates to a method and system for transmitting and receiving user's personal information using an agent, and more particularly, to a method and system for transmitting and receiving user's personal information safely from external attack by embedding the user's personal information into a software mobile agent.

BACKGROUND ART

Many Internet sites demand registration from users while providing services. In order to take advantage of services when joining a site, users input their important personal information such as a name, a social security number, an address, a telephone number, and an e-mail address.

In such an environment, approaches for safely managing and circulating user's information have been proposed. A representative suggests Internet Identity management systems that provide a more convenient and safe environment for users using the Internet. In detail, Internet Identity management systems provide a Single Sign On (SSO) service allowing users to freely use many sites on the Internet through a single login process and store the users' information in a safe site so that users can keep their information up-to-date and manage their information safely. Many standards and technology relating to these features have been researched and developed. Representatives are SAML of the OASIS group, ID-FF, ID-WSF, and ID-SIS of Liberty Alliance, and WS-Security of Microsoft and IBM. P3P of W3C, XACML of OASIS, and EPAL of IBM are also standards for safely managing user's personal information.

Besides Internet Identity management systems and personal information technology, a software mobile agent is the kernel of the present invention. The software mobile agent can be expressed simply in that it is software that automatically solves tasks that a user desires. Agent technology is a concept that has been being studied for a long time in the field of artificial intelligence and has separated from artificial intelligence and emerged as an independent research subject since the end of the '80s. Since the middle of the '90s, various agent techniques have been developed with the introduction of the Internet. Agents have been utilized in information searching for collecting information on the Internet, electronic commerce such as online shopping, and mobile computing such as messaging. Agents may exist in various forms according to service environments. In the present invention, an agent is a mobile agent that can move to and work in a different host and includes an encryption module to safely protect user's information.

DISCLOSURE OF INVENTION

Technical Problem

When users join so many sites, it is not easy for users to remember sites where their personal information was registered and what information they input in the sites. Numerous small sites on the Internet also do not consider information protection and privacy protection at all when managing client information. Furthermore, selling client information illegally takes place.

Technical Solution

The present invention provides a method and system for transmitting and receiving user's personal information, in which an agent including the user's personal information is transmitted to a client needing the user's personal information, instead of directly transmitting the user's personal information on the Internet, so that the user's personal information is safely transmitted.

The present invention also provides a method and system for transmitting and receiving user's personal information to prevent a client from illegally providing an agent to other clients and prevent an attacker from acquiring user's personal information even when the attacker acquires an agent on a network.

Advantageous Effects

According to the present invention, since user's personal information is embedded into a software mobile agent when user's personal information is transmitted, user's personal information is safely protected from external attacks while being transmitted to a requesting client. In addition, the software mobile agent checks a client requesting user's personal information, the purpose of using the user's personal information and user's conditions. Only when the above mentioned conditions checked by the software mobile agent are met, the software mobile agent provides the user's personal information to the client, whereby malicious or illegal use of the user's personal information is prevented.

DESCRIPTION OF DRAWINGS

The above and other features and advantages of the present invention will become more apparent by describing in detail exemplary embodiments thereof with reference to the attached drawings in which.

BEST MODE

According to an aspect of the present invention, there is provided a method of transmitting user's personal information. The method includes detecting user's personal information in response to a user's personal information request message from a client using an information management server; generating an encryption key used to encrypt the detected user's personal information and a decryption key used to decrypt the encrypted user's personal information; encrypting the detected user's personal information using the encryption key and signing the encrypted user's personal information; generating an agent including the encrypted user's personal information, a user's personal information signature value, and verification information used to provide the user's personal information only to an authorized client; and transmitting the agent and the decryption key to the client.

According to another aspect of the present invention, there is provided a method of receiving user's personal information. In the method, a client receives from an information management server an agent including encrypted user's personal information, a user's personal information signature value, verification information used to provide user's personal information only to an authorized client and a decryption key used to decrypt the encrypted user's personal information. The client transmits a user's personal information request message to the agent. The agent determines whether the client is fairly authorized based on the verification information. When it is determined that the client is authorized, the agent provides the encrypted user's personal information and the user's personal information signature value to the client. The client verifies the user's personal information signature value using a public key of the information management server and, when the user's personal information signature value is verified, decrypts the encrypted user's personal information using the decryption key to extract the user's personal information.

According to still another aspect of the present invention, there is provided a system for transmitting user's personal information. The system includes an information detector detecting user's personal information, that has been restored in advance, in response to a user's personal information request message from a client; a key generator generating an encryption key to encrypt the detected user's personal information and a decryption key to decrypt the encrypted user's personal information; an encryption unit encrypting the detected user's personal information using the encryption key and signing the encrypted user's personal information; an agent generator generating an agent including the encrypted user's personal information, a user's personal information signature value, and verification information used to provide the user's personal information only to an authorized client; and a transceiver receiving the user's personal information request message from the client, outputting the user's personal information request message to the information detector, and transmitting the agent and the decryption key to the client.

According to yet another aspect of the present invention, there is provided a system for receiving user's personal information. The system includes a transceiver transmitting a user's personal information request message to an information management server and receiving from the information management server an agent including encrypted user's personal information, a user's personal information signature value, and verification information used to provide user's personal information only to an authorized system and a decryption key used to decrypt the encrypted user's personal information; an agent interface unit transmitting a user's personal information request message to the agent and receiving the encrypted user's personal information and the user's personal information signature value from the agent when the agent determines that the system is authorized to access the user's personal information based on the verification information; and a decryption unit verifying the user's personal information signature value received through the agent interface using a public key of the information management server and decrypting the encrypted user's personal information using the decryption key to extract the user's personal information.

MODE FOR INVENTION

Hereinafter, preferred embodiments of the present invention will be described in detail with reference to the attached drawings.

Figure 1:
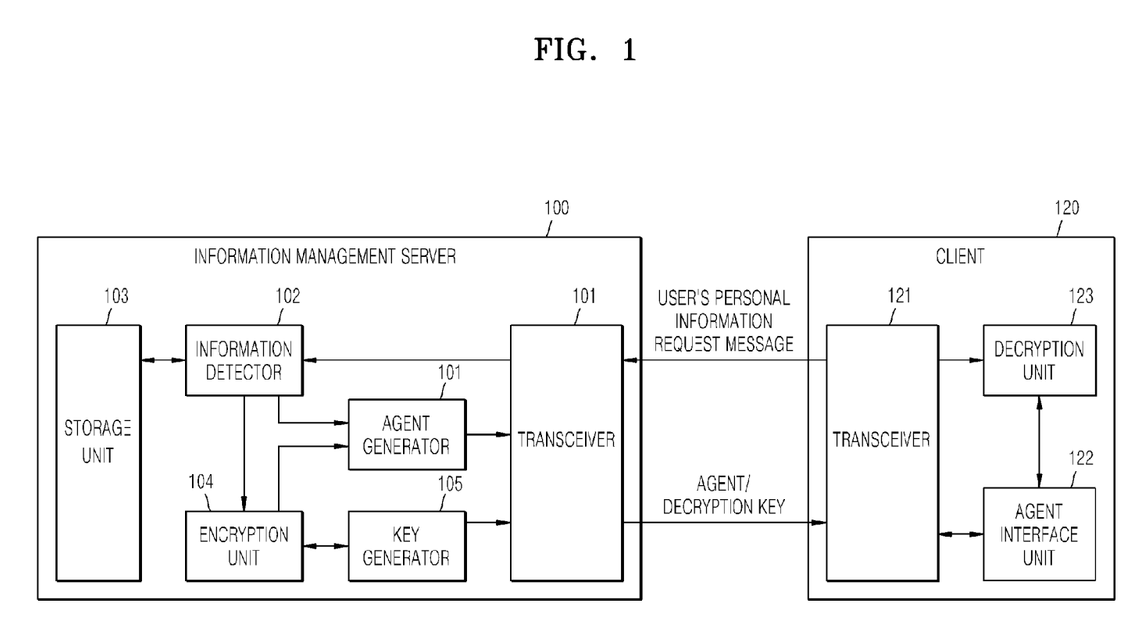
FIG. 1 is a block diagram of a system for transmitting and receiving user's personal information using an agent, according to an embodiment of the present invention.

FIG. 1 is a block diagram of a system for transmitting and receiving user's personal information using an agent, according to an embodiment of the present invention. Referring to FIG. 1, the system includes an information management server 100 and a client 120.

The information management server 100 is a server that manages user's personal information and serves to keep the user's personal information safe from external attacks.

The client 120 is an object that requests the user's personal information from the information management server 100 and uses the user's personal information to provide services at users' requests or for other various purposes (e.g., advertisement transmission, gift presentation, and user statistics) including political reasons.

The information management server 100 includes a transceiver 101, an information detector 102, a storage unit 103, an encryption unit 104, a key generator 105, and an agent generator 106.

A receiving module of the transceiver 101 receives from the client 120 a request message that requests the user's personal information. The request message includes user's purpose information indicating the purpose of using the user's personal information.

The storage unit 103 stores the user's personal information in advance. In this embodiment of the present invention, storing the user's personal information in advance indicates that a user has registered his/her personal information and assigned the management of the personal information to the information management server 100. The user's personal information may include a social security number, an address, a telephone number, etc.

The information detector 102 detects the user's personal information stored in the storage unit 103 in response to a request message received through the transceiver 101 and transmits the user's personal information to the encryption unit 104. In addition, the information detector 102 detects the user's purpose information included in the request message and transmits the user's purpose information to the agent generator 106.

The key generator 105 generates an encryption key for encrypting the user's personal information and a decryption key for decrypting the encrypted user's personal information. The key generator 105 transmits the encryption key to the encryption unit 104 and transmits the decryption key to the transceiver 101.

The encryption unit 104 receives the user's personal information detected by the information detector 102 and an encryption key from the key generator 105. The encryption unit 104 encrypts the user's personal information received from the information detector 102 with the encryption key received from the key generator 105. In addition, the encryption unit 104 signs the encrypted user's personal information using a private key of the information management server 100. The reason for signing as described above is to prove that the user's personal information included in an agent, which will be described below, is an authorized one that has been stored in the storage unit 103 of the information management server 100.

The agent generator 106 receives the encrypted user's personal information and a user's personal information signature value from the encryption unit 104 and receives user's purpose information indicating the purpose of using the user's personal information from the information detector 102. The agent generator 106 generates an agent including the encrypted user's personal information and the user's personal information signature value. The agent generated by the agent generator 106 may further include the user's purpose information, an effective period, a user's count limit of the user's personal information, and verification information including a public key of the client 120.

Such information is included in the agent to prevent the user's personal information from being illegally revealed to others other than a relevant user. For example, when an agent transmitted over a network is illegally acquired or when the client 120 provides an agent and a decryption key to others without permission of the information management server 100, malicious use of the user's personal information can be prevented since the agent checks the purpose of use, verifies whether a current client is authorized, and limits an effective period and the user's count limit of the user's personal information.

The user's purpose information is used to reconfirm the purpose of using the user's personal information before the client 120 provides the user's personal information. Due to the effective period and the user's count limit of the user's personal information, an unauthorized user acquiring an agent is prohibited from obtaining the user's personal information from the agent when the effective period expires or a counted number exceeds the user's count limit of the user's personal information. For example, the limit of the effective period and the user's count limit of user's personal information may be expressed in the form, 'User A's social security number will be revealed up to three times only to ×(date)×(month)'. A client's public key is used by an agent to verify whether a request for information is authorized.

A transmitting module of the transceiver 101 receives an agent generated by the agent generator 106 and a decryption key generated by the key generator 105 and transmits them to the client 120. The agent and the decryption key are safely transmitted through a security channel to the client 120.

The client 120 includes a transceiver 121, an agent interface unit 122, and a decryption unit 123.

A transmitting module of the transceiver 121 transmits a user's personal information request message to the information management server 100. As described above, the user's personal information request message includes user's purpose information indicating the purpose of using the user's personal information.

A receiving module of the transceiver 121 receives the agent and the decryption key from the information management server 100. The receiving module of the transceiver 121 outputs the agent to the agent interface unit 122 and outputs the decryption key to the decryption unit 123.

The agent interface unit 122 transmits the user's personal information request message to the received agent. The request message transmitted to the agent includes user's purpose information indicating the purpose of using the user's personal information. In addition, the agent interface unit 122 signs the request message using a private key of the client 120 and transmits a corresponding signature value to the agent together with the request message.

An agent analyzes the request message to determine whether a request is authorized. When it is determined that the request is authorized, the agent provides the encrypted user's personal information and the user's personal information signature value to the agent interface unit 122.

The agent interface unit 122 output provided information to the decryption unit 123. The decryption unit 123 verifies the user's personal information signature value using a public key of the information management server 100. When the user's personal information signature value is verified, the decryption unit 123 decrypts the encrypted user's personal information using the decryption key directly received from the receiving module of the transceiver 121 to extract the user's personal information.

Figure 2:
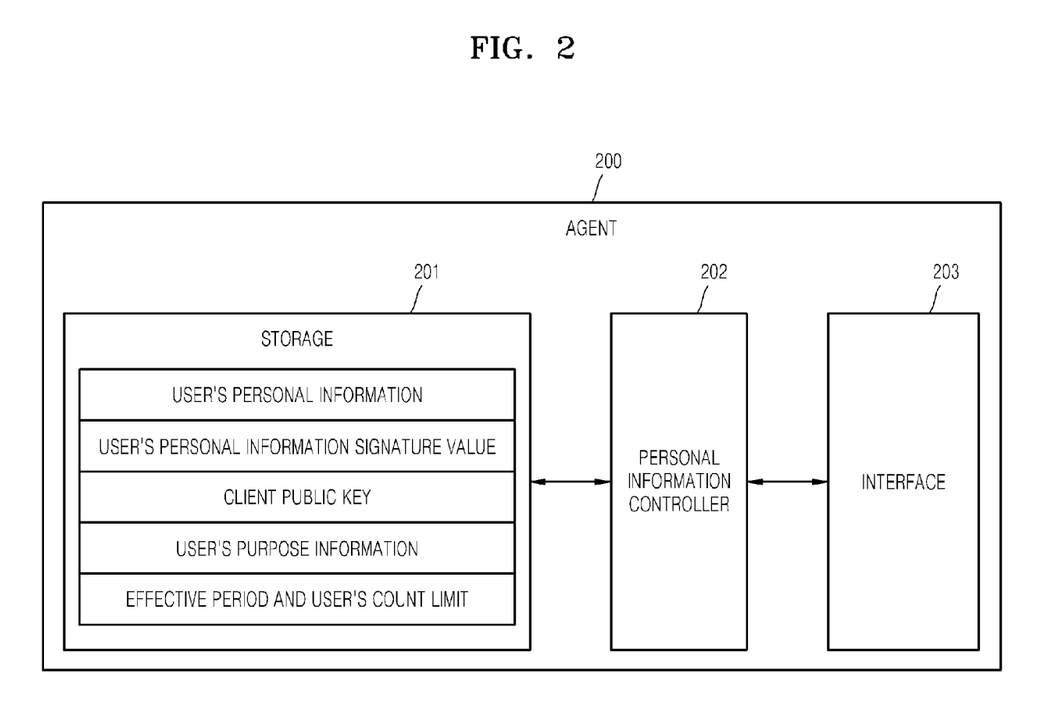
FIG. 2 is a detailed block diagram of an agent generated by an agent generator illustrated in FIG. 1, according to an embodiment of the present invention.

FIG. 2 is a detailed block diagram of an agent 200 generated by the agent generator 106 illustrated in FIG. 1. The agent 200 includes a storage 201, a personal information controller 202, and an interface 203.

The storage 201 stores encrypted user's personal information, a user's personal information signature value generated when the encrypted user's personal information is signed using a private key of the information management server 100, a public key of the client 120, user's purpose information, an effective period and a user's count limit of the user's personal information.

The interface 203 receives a user's personal information request message from the agent interface unit 122 included in the client 120. The request message includes a requested item of user's personal information, user's purpose information indicating the purpose of using the user's personal information, and a message signature value generated when the request message is signed using a private key of the client 120. The interface 203 outputs the information included in the request message to the personal information controller 202.

The personal information controller 202 determines whether the requested item of user's personal information included in the request message is present in the storage 201 and determines whether the user's purpose information included in the request message agrees with the user's purpose information stored in the storage 201. In addition, the personal information controller 202 determines whether an arrival time of the request message is within the effective period stored in the storage 201 and whether a total number of requests is less than or equal to the user's count limit stored in the storage 201. If the request message is verified as proper through the above-described determination process, the user's personal information message signature value included in the request message is verified to determine whether the request is legally authorized. If the request message is verified affirmatively, the message signature value included in the request message is verified using the public key of the client 120 in the storage 201 to confirm that the request is legally authorized.

When the user's personal information message signature value is verified affirmatively, the personal information controller 202 outputs the encrypted user's personal information and the user's personal information signature value, that are stored in the storage 201, to the interface 203.

Figure 3:
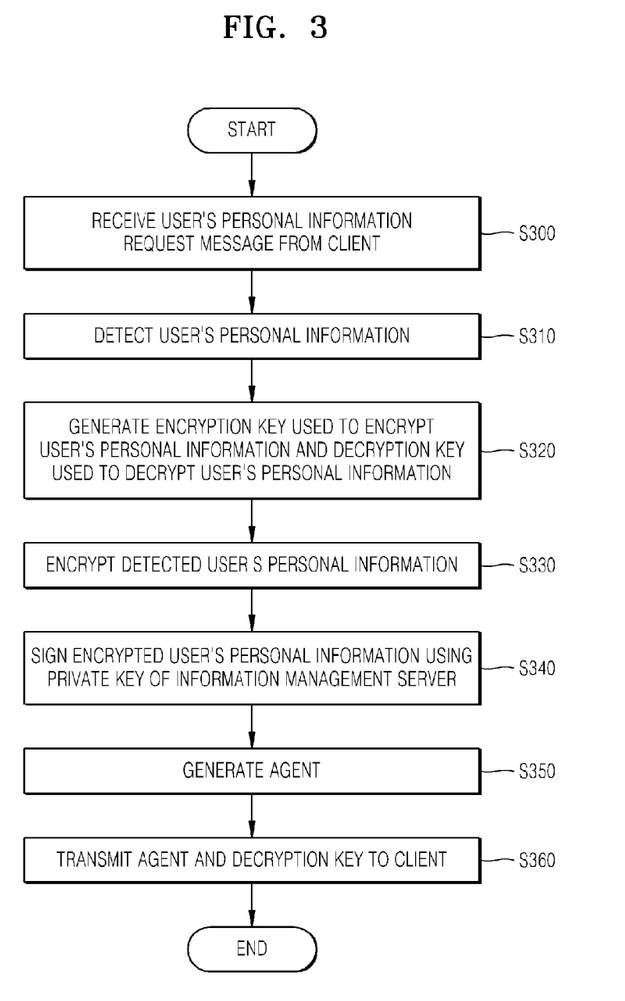
FIG. 3 is a flowchart of a method of transmitting user's personal information using an agent, according to an embodiment of the present invention.

FIG. 3 is a flowchart of a method of transmitting user's personal information using an agent, according to an embodiment of the present invention. In operation S300, the information management server 100 (FIG. 1) receives a user's personal information request message from the client 120 (FIG. 1). In this operation, the user's personal information request message includes user's purpose information indicating the purpose of using the user's personal information.

In operation S310, the information management server 100 detects the user's personal information corresponding to the user's personal information request message. In this operation, the user's personal information is stored in the storage unit 103 of the information management server 100 in advance.

In operation S320, an encryption key used to encrypt the detected user's personal information and a decryption key used to decrypt the encrypted user's personal information are generated.

In operation S330, the detected user's personal information is encrypted using the generated encryption key.

In operation S340, the encrypted user's personal information is signed using a private key of the information management server 100 to generate a user's personal information signature value.

In operation S350, an agent including the encrypted user's personal information and the user's personal information signature value is generated. The agent further includes user's purpose information, an effective period, a user's count limit of the user's personal information, and verification information including a public key of the client 120.

In operation S360, the agent and the decryption key are transmitted to the client 120.

Figure 4:
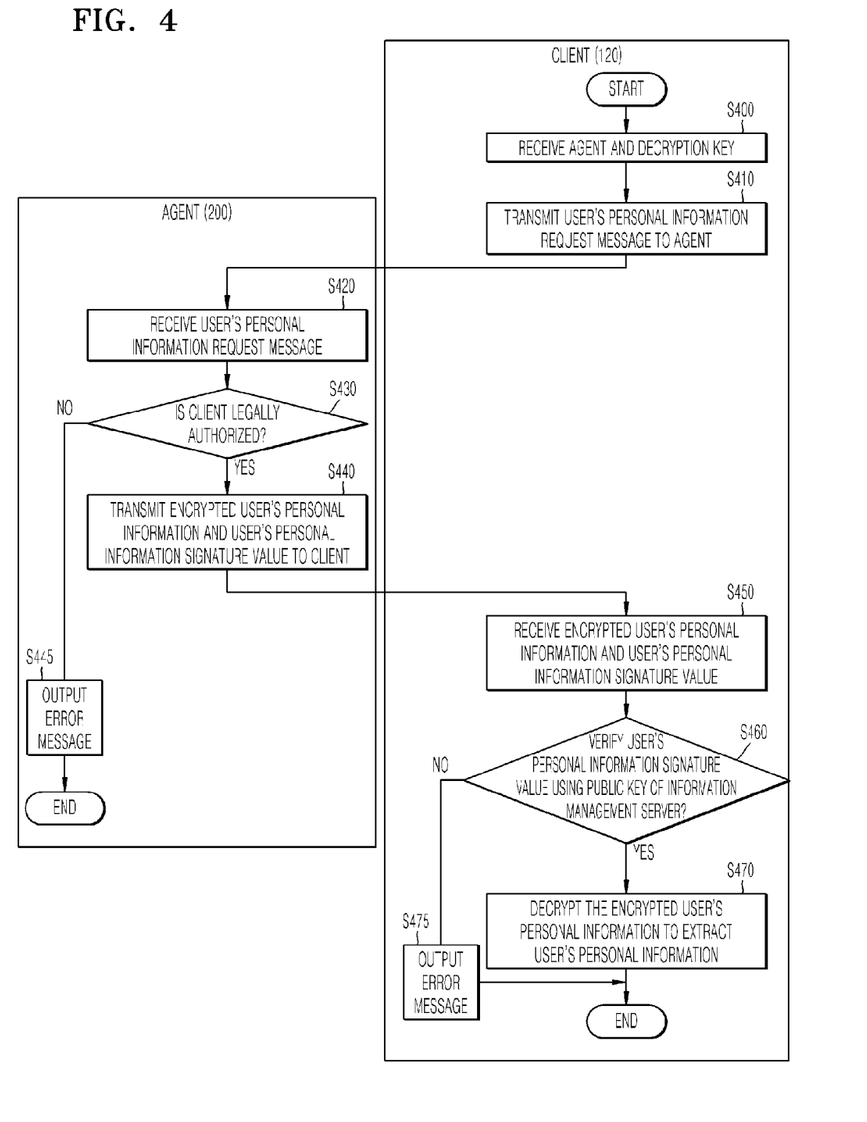
FIG. 4 is a flowchart of a method of receiving user's personal information using an agent, according to an embodiment of the present invention.

FIG. 4 is a flowchart of a method of receiving user's personal information using an agent, according to an embodiment of the present invention. In operation S400, the client 120 (FIG. 1) receives an agent including encrypted user's personal information, a user's personal information signature value and a decryption key from the information management server 100 (FIG. 1). In this operation, the decryption key is used to decrypt the user's personal information that has been encrypted using an encryption key by the information management server 100. In operation S410, the client transmits a user's personal information request message to the agent 200 (FIG. 2).

In operation S420, the agent 200 receives the user's personal information request message. In operation S430, the agent 200 determines whether the client 120 is legally authorized. For this operation, the agent 200 determines whether a requested item of user's personal information included in the request message is present in the storage 201 (FIG. 2), whether a user's purpose included in the request message agrees with user's purpose information stored in the storage 201, whether the arrival time of the request message is within an effective period stored in the storage 201, and whether a total number of requests is less than or equal to a user's count limit stored in the storage 201. If all of the results of the above mentioned determinations are affirmative, the agent verifies a message signature value included in the request message using a public key of the client 120 to determine whether the client 120 is legally authorized.

If it is determined that the client 120 is not legally authorized, in operation S445, the agent 200 transmits an error message to the client 120.

Otherwise, if it is determined that the client 120 is legally authorized, in operation S440, the agent transmits the encrypted user's personal information and the user's personal information signature value to the client 120.

In operation S450, the client 120 receives encrypted user's personal information and a user's personal information signature value. In operation S460, the client 120 verifies the user's personal information signature value using a public key of the information management server 100 (FIG. 1). If the user's personal information signature value is not verified, in operation S475, the client 120 outputs an error message. If the user's personal information signature value is verified, in operation S470, the client 120 decrypts the encrypted user's personal information to extract user's personal information.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of transmitting user's personal information, the method comprising:

detecting user's personal information in response to a user's personal information request message from a client using an information management server;

generating an encryption key used to encrypt the detected user's personal information and a decryption key used to decrypt the encrypted user's personal information;

encrypting the detected user's personal information using the encryption key and signing the encrypted user's personal information;

generating an agent comprising the encrypted user's personal information, a user's personal information signature value, and verification information used to provide the user's personal information only to an authorized client, wherein the verification information comprises the user's purpose information comprised in the user's personal information request message; and transmitting the agent and the decryption key to the client, wherein the verification information is included in the agent before the user's personal information is encrypted and the user's personal information signature value is transmitted to the client, wherein the verification information:

is included without being encrypted so that the verification information can be utilized by the client without decryption, and comprises a public key of the client; and wherein the agent receives the user's personal information request message from the client and detects the encrypted user's personal information and the user's personal information signature value when it is determined that the client is authorized to access the user's personal information based on the verification information, wherein the agent is a software mobile agent which can move to and work in a different host.

2. The method of claim 1, wherein the user's personal information request message comprises user's purpose information indicating the purpose of using the user's personal information, and the information management server detects the user's personal information only when the user's purpose information comprised in the user's personal information request message agrees with a predetermined user's purpose information.

3. The method of claim 2, wherein the verification information comprises the user's purpose information comprised in the user's personal information request message.

4. The method of claim 1, wherein the verification information comprises at least one of an effective period, a user's count limit of the user's personal information.

5. The method of claim 1, wherein the agent is a software mobile agent that is transmitted from the information management server to the client.

6. A method of receiving user's personal information, the method comprising:
   a client receiving from an information management server an agent comprising encrypted user's personal information, a user's personal information signature value, verification information used to provide user's personal information only to an authorized client, wherein the verification information comprises the user's purpose information comprised in the user's personal information request message, and a decryption key used to decrypt the encrypted user's personal information;
   the client transmitting a user's personal information request message to the agent;
   the agent determining whether the client is fairly authorized based on the verification information;
   when it is determined that the client is authorized, the agent providing the encrypted user's personal information and the user's personal information signature value to the client; and
   the client verifying the user's personal information signature value using a public key of the information management server and, when the user's personal information signature value is verified, decrypting the encrypted user's personal information using the decryption key to extract the user's personal information,
   wherein the verification information is included in the agent before the user's personal information is encrypted and the user's personal information signature value is transmitted to the client, wherein the verification information:
      is included without being encrypted so that the verification information can be utilized by the client without decryption, and
      comprises a public key of the client; and
   wherein the agent receives the user's personal information request message from the client and detects the encrypted user's personal information and the user's personal information signature value when it is determined that the client is authorized to access the user's personal information based on the verification information,
   wherein the agent is a software mobile agent which can move to and work in a different host.

7. The method of claim 6, wherein the verification information comprises user's purpose information indicating the purpose of using the user's personal information,
   the user's personal information request message transmitted to the agent comprising user's purpose information indicating the purpose of using the user's personal information, and
   determining of whether the client is fairly authorized comprises determining whether the user's purpose information comprised in the verification information is the same as the user's purpose information comprised in the user's personal information request message.

8. The method of claim 6, wherein the verification information comprises at least one of an effective period and a user's count limit of the user's personal information, and
   determining whether the client is fairly authorized comprises determining whether at least one condition of the effective period and the user's count limit is satisfied.

9. The method of claim 6, wherein the verification information comprises a public key of the client, and
   determining of whether the client is fairly authorized comprises determining whether the client is authorized using the public key of the client.

10. The method of claim 6, wherein the agent is a software mobile agent that is transmitted from the information management server to the client.

11. A system for transmitting user's personal information, the system comprising:
    an information detector detecting user's personal information, that has been stored in advance, in response to a user's personal information request message from a client;
    a key generator generating an encryption key to encrypt the detected user's personal information and a decryption key to decrypt the encrypted user's personal information;
    an encryptor encrypting the detected user's personal information using the encryption key and signing the encrypted user's personal information;
    an agent generator generating an agent comprising the encrypted user's personal information, a user's personal information signature value, and verification information used to provide the user's personal information only to an authorized client, wherein the verification information comprises the user's purpose information comprised in the user's personal information request message; and
    a transceiver receiving the user's personal information request message from the client, outputting the user's personal information request message to the information detector, and transmitting the agent and the decryption key to the client, wherein the verification information is included in the agent before the user's personal information is encrypted and the user's personal information signature value is transmitted to the client, wherein the verification information:
       is included without being encrypted so that the verification information can be utilized by the client without decryption, and
       comprises a public key of the client;
    wherein the agent receives the user's personal information request message from the client and detects the encrypted user's personal information and the user's personal information signature value when it is determined that the client is authorized to access the user's personal information based on the verification information, wherein authorization is based on:
       a requested item from the user's personal information that is present in storage, the user's purpose information in the user's personal information request message agreeing with the purpose information in the storage,
       an arrival time of the request message within an effective period, and a total number of requests that are less than or equal to a user's count limit stored in the storage, wherein the agent is a software mobile agent which can move to and work in a different host.

12. The system of claim 11, wherein the user's personal information request message comprises user's purpose information indicating the purpose of using the user's personal information, and the information detector detecting the user's personal information only when the user's purpose information comprised in the user's personal information request message agrees with a predetermined user's purpose information.

13. The system of claim 11, wherein the verification information comprises at least one among user's purpose information indicating the purpose of using the user's personal information, an effective period, a user's count limit of the user's personal information, and a public key of the client.

14. The system of claim 11, wherein the agent comprises:
a storage storing the encrypted user's personal information, the user's personal information signature value, and the verification information; and
an interface receiving the user's personal information request message from the client, transmitting the user's personal information request message to the personal information controller, and transmitting the encrypted user's personal information and the user's personal information signature value to the client.

15. A system for receiving user's personal information, the system comprising:
a transceiver transmitting a users' personal information request message to an information management server and receiving from the information management server an agent comprising encrypted user's personal information, a user's personal information signature value, and verification information used to provide user's personal information only to an authorized system and a decryption key used to decrypt the encrypted user's personal information, wherein the verification information comprises the user's purpose information comprised in the user's personal information request message;
an agent interface transmitting a user's personal information request message to the agent and receiving the encrypted user's personal information and the user's personal information signature value from the agent when the agent determines that the system is authorized to access the user's personal information based on the verification information; and
a decryptor verifying the user's personal information signature value received through the agent interface using a public key of the information management server and decrypting the encrypted user's personal information using the decryption key to extract the user's personal information,
wherein the verification information is included in the agent before the user's personal information is encrypted and the user's personal information signature value is transmitted to the client, wherein the verification information:
is included without being encrypted so that the verification information can be utilized by the client without decryption, and
comprises a public key of the account
wherein the agent receives the user's personal information request message from the client and detects the encrypted user's personal information and the user's personal information signature value when it is determined that the client is authorized to access the user's personal information based on the verification information, wherein authorization is based on:
a requested item from the user's personal information that is present in storage, the user's purpose information in the user's personal information request message agreeing with the purpose information in the storage,
an arrival time of the request message within an effective period, and a
total number of requests that are less than or equal to a user's count limit stored in the storage,
wherein the agent is a software mobile agent which can move to and work in a different host.

16. The system of claim 15, wherein the verification information comprises at least one among user's purpose information indicating the purpose of using the user's personal information, an effective period, a user's count limit of the user's personal information, and a public key of the system.

17. The system of claim 15, wherein the agent comprises:
a storage storing the encrypted user's personal information, the user's personal information signature value, and the verification information; and
an interface receiving the user's personal information request message from the agent interface, transmitting the user's personal information request message to the personal information controller, and transmitting the encrypted user's personal information and the user's personal information signature value to the agent interface unit.

* * * * *